United States Patent
Wuellner et al.

(10) Patent No.: US 9,693,276 B1
(45) Date of Patent: Jun. 27, 2017

(54) SYSTEM AND METHOD FOR INTELLIGENT NETWORK CONNECTION SELECTION

(71) Applicant: GOOGLE INC., Mountain View, CA (US)

(72) Inventors: Trond Thomas Wuellner, Mountain View, CA (US); Ryan Cairns, Los Altos, CA (US); Paul Stewart, Los Altos, CA (US)

(73) Assignee: Google Inc., Mountain View, CA (US)

( * ) Notice: Subject to any disclaimer, the term of this patent is extended or adjusted under 35 U.S.C. 154(b) by 353 days.

(21) Appl. No.: 14/088,969

(22) Filed: Nov. 25, 2013

(51) Int. Cl.
*H04W 36/24* (2009.01)
*H04L 12/24* (2006.01)
*H04W 48/18* (2009.01)

(52) U.S. Cl.
CPC ........... *H04W 36/245* (2013.01); *H04L 41/00* (2013.01); *H04W 36/24* (2013.01); *H04W 48/18* (2013.01)

(58) Field of Classification Search
CPC ..................................................... H04W 48/18
See application file for complete search history.

(56) References Cited

U.S. PATENT DOCUMENTS

| | | |
|---|---|---|
| 5,801,970 A | 9/1998 | Rowland et al. |
| 6,494,831 B1 | 12/2002 | Koritzinsky |
| 6,614,769 B1 | 9/2003 | Erlick et al. |
| 6,917,850 B2 | 7/2005 | Kamishio |
| 7,203,517 B2 | 4/2007 | Shimoda et al. |
| 7,479,943 B1 | 1/2009 | Lunsford et al. |
| 7,793,316 B2 | 9/2010 | Mears et al. |
| 7,940,206 B2 | 5/2011 | Nohara et al. |
| 8,174,994 B2 * | 5/2012 | Forssell et al. ........ H04W 88/06 370/252 |

(Continued)

FOREIGN PATENT DOCUMENTS

| | | |
|---|---|---|
| EP | 0815701 A1 | 1/1998 |
| EP | 2169924 B1 | 9/2011 |

(Continued)

OTHER PUBLICATIONS

Joe, Inwhee et al., Abstract of "A Network Selection Algorithm considering Power Consumption in Hybrid Wireless Networks", retrieved from http://ieeexplore.ieee.org, Aug. 14, 2013, 2 pages.

(Continued)

*Primary Examiner* — Jimmy H Tran
(74) *Attorney, Agent, or Firm* — Brake Hughes Bellermann LLP (57) ABSTRACT

In some embodiments, a device for network connection selection may include a network connection selector configured to obtain historical connection information related to previous network connections utilized by a device. The historical connection information may include connectivity disruptions indicating whether connectivity was disrupted for one or more network connections that were previously established by the device. The network connection selector may be configured to select a network connection for the device among a plurality of available network connections based on an evaluation of the historical connection information such that the selected network connection substantially maintains connectivity to a network for a future period of time.

17 Claims, 4 Drawing Sheets

(56) References Cited

U.S. PATENT DOCUMENTS

| | | | | |
|---|---|---|---|---|
| 8,199,731 | B2* | 6/2012 | Bourque | H04W 76/021 370/329 |
| 8,447,865 | B2* | 5/2013 | Bansal et al. | H04W 4/02 370/331 |
| 8,555,363 | B2 | 10/2013 | Lo et al. | |
| 8,676,273 | B1* | 3/2014 | Fujisaki | H04M 1/6505 379/142.06 |
| 8,705,527 | B1* | 4/2014 | Addepalli et al. | H04W 4/046 370/389 |
| 8,781,475 | B1* | 7/2014 | McKeeman | H04W 36/32 370/331 |
| 8,862,715 | B1 | 10/2014 | Tom et al. | |
| 8,897,802 | B2* | 11/2014 | Meredith et al. | H04W 48/18 455/456.1 |
| 8,948,779 | B1* | 2/2015 | Choi | H04L 67/303 455/456.1 |
| 9,277,370 | B2* | 3/2016 | Addepalli et al. | H04W 4/046 |
| 2003/0126232 | A1 | 7/2003 | Mogul et al. | |
| 2004/0100923 | A1 | 5/2004 | Yam | |
| 2004/0157624 | A1 | 8/2004 | Hrastar | |
| 2005/0255856 | A1* | 11/2005 | Griffin et al. | H04W 36/0083 455/456.1 |
| 2006/0175753 | A1 | 8/2006 | MacIver et al. | |
| 2006/0259951 | A1* | 11/2006 | Forssell et al. | H04W 88/06 726/1 |
| 2007/0156804 | A1* | 7/2007 | Mo | H04W 8/02 709/200 |
| 2007/0171879 | A1* | 7/2007 | Bourque | H04W 76/021 370/338 |
| 2008/0125103 | A1 | 5/2008 | Mock | |
| 2008/0125163 | A1 | 5/2008 | Chi et al. | |
| 2009/0006522 | A1 | 1/2009 | Kim et al. | |
| 2009/0327478 | A1 | 12/2009 | Krause et al. | |
| 2010/0081406 | A1 | 4/2010 | Tan et al. | |
| 2010/0103829 | A1* | 4/2010 | Murzeau et al. | H04W 60/04 370/252 |
| 2010/0145479 | A1 | 6/2010 | Griffiths | |
| 2010/0178928 | A1* | 7/2010 | O'Reilly | H04W 28/26 455/452.2 |
| 2010/0184440 | A1* | 7/2010 | Mao et al. | H04W 48/18 455/438 |
| 2010/0199197 | A1 | 8/2010 | Faletski et al. | |
| 2010/0255856 | A1 | 10/2010 | Kansal et al. | |
| 2011/0086638 | A1 | 4/2011 | Medapalli | |
| 2011/0131506 | A1 | 6/2011 | Calissendorff | |
| 2011/0215966 | A1 | 9/2011 | Kim et al. | |
| 2012/0322497 | A1* | 12/2012 | Navda et al. | H04W 36/0083 455/525 |
| 2013/0005242 | A1 | 1/2013 | Royston | |
| 2013/0023274 | A1* | 1/2013 | Meredith et al. | H04W 48/18 455/450 |
| 2013/0107794 | A1 | 5/2013 | Yamada | |
| 2013/0232272 | A1* | 9/2013 | Bansal et al. | H04W 4/02 709/227 |
| 2014/0035378 | A1 | 2/2014 | Kesler et al. | |
| 2014/0215491 | A1* | 7/2014 | Addepalli et al. | H04W 4/046 719/313 |
| 2014/0355565 | A1* | 12/2014 | Hayes et al. | H04W 36/245 370/331 |
| 2015/0026312 | A1* | 1/2015 | Othmer et al. | H04L 41/0803 709/220 |
| 2015/0133143 | A1* | 5/2015 | Huang et al. | H04W 64/006 455/456.1 |
| 2015/0201377 | A1 | 7/2015 | Harrison et al. | |
| 2016/0073287 | A1* | 3/2016 | Himayat et al. | H04W 48/18 370/236 |

FOREIGN PATENT DOCUMENTS

| | | |
|---|---|---|
| EP | 2413635 B1 | 9/2012 |
| EP | 2575398 A1 | 4/2013 |
| WO | 2008/043718 A1 | 4/2008 |
| WO | 2013/154552 A1 | 10/2013 |

OTHER PUBLICATIONS

Non-Final Office Action received for U.S. Appl. No. 13/081,216, mailed on May 22, 2013, 26 pages.

Final Office Action received for U.S. Appl. No. 13/081,216, mailed on Dec. 5, 2013, 24 pages.

Non-Final Office Action received for U.S. Appl. No. 13/081,216, mailed on Mar. 27, 2014, 28 pages.

Non-Final Office Action received for U.S. Appl. No. 13/246,792, mailed on Feb. 1, 2012, 12 pages.

Final Office Action received for U.S. Appl. No. 13/246,792, mailed on Jun. 28, 2012, 15 pages.

Notice of Allowance received for U.S. Appl. No. 13/246,792, mailed on Jun. 30, 2014, 5 pages.

Mon-Final Office Action received for U.S. Appl. No. 13/491,489, mailed on Jul. 6, 2015, 16 pages.

Final Office Action received for U.S. Appl. No. 13/491,489, mailed on Nov. 30, 2015, 11 pages.

Response to Final Office Action for U.S. Appl. No. 13/491,489, filed Jan. 29, 2016, 10 pages.

Notice of Allowance for U.S. Appl. No. 13/491,489, mailed on Mar. 1, 2016, 5 pages.

* cited by examiner

SYSTEM AND METHOD FOR INTELLIGENT NETWORK CONNECTION SELECTION

TECHNICAL FIELD

This description relates to network connection selection.

BACKGROUND

Electronic devices may support one or more network interfaces for communication with other electronic devices and/or one or more servers. Where an electronic device supports multiple network interfaces, the electronic device may select a particular network interface (e.g., selects WiFi over 4G) for communication with another electronic device or server via a network. Some conventional approaches may select the network interface having the highest signal strength or the network interface consuming the least amount of power. However, the network interface that has been selected according to these conventional approaches may not provide the best network interface in terms of minimizing connectivity disruptions.

SUMMARY

The details of one or more implementations are set forth in the accompanying drawings and the description below. Other features will be apparent from the description and drawings, and from the claims.

In some embodiments, a device for network connection selection may include at least one semiconductor processor and a non-transitory computer-readable medium storing instructions which, when executed by the at least one semiconductor processor, are configured to implement a network connection selector. The network connection selector may be configured to obtain historical connection information related to previous network connections utilized by a device. The historical connection information may include connectivity disruptions indicating whether connectivity was disrupted for one or more network connections that were previously established by the device. The network connection selector may be configured to select a network connection for the device among a plurality of available network connections based on an evaluation of the historical connection information such that the selected network connection substantially maintains connectivity to a network for a future period of time.

The plurality of available network connections may include a plurality of network interfaces, and the network connection selector may be configured to select one of the plurality of network interfaces based on historical connection information pertaining to at least one of the plurality of network interfaces. The plurality of available network connections may include a Wi-Fi network connection having a first access point, a Wi-Fi network connection having a second access point, and a mobile network connection.

The historical connection information may include the connectivity disruptions in association with at least one of locations and times of when the connection disruptions previously occurred. The historical connection information may further track signal strength and data rates for the one or more network connections that were previously established by the device.

The network connection selector may be configured to obtain historical location pattern data providing a location pattern. The network connection selector may be configured to select the network connection among the plurality of available network connections based on an evaluation of the historical location pattern data and the historical connection information. The network connection selector may be configured to select the network connection such that connection disruption is minimized within at least a portion of the location pattern for the future period of time.

The network connection selector may be configured to select the network connection among the plurality of available network connections when the device is activated from a power-saving state.

In some embodiments, a non-transitory computer readable medium storing instructions, when executed by at least one semiconductor processor, may be configured to obtain historical connection information related to previous network connections utilized by a device. The historical connection information may include connectivity disruptions indicating whether connectivity was disrupted for one or more network connections that were previously established by the device. The instructions may include a select a network connection for the device among a plurality of available network connections based on an evaluation of the historical connection information such that the selected network connection substantially maintains connectivity to a network for a future period of time.

The plurality of available network connections may include a plurality of network interfaces, and the network connection selector may be configured to select one of the plurality of network interfaces based on historical connection information pertaining to at least one of the plurality of network interfaces.

The plurality of available network connections may include a Wi-Fi network connection having a first access point, a Wi-Fi network connection having a second access point, and a mobile network connection. The historical connection information may include the connectivity disruptions in association with at least one of locations and times of when the connection disruptions previously occurred. The historical connection information may further track signal strength and data rates for the one or more network connections that were previously established by the device.

The instructions may include instruction to obtain historical location pattern data providing a location pattern, and select the network connection among the plurality of available network connections based on an evaluation of the historical location pattern data and the historical connection information. The instructions may include instructions to select the network connection such that connection disruption is minimized within at least a portion of the location pattern for the future period of time.

In some embodiments, a computer-implemented method for network connection selection may include obtaining historical connection information related to previous network connections utilized by a device. The historical connection information may include connectivity disruptions indicating whether connectivity was disrupted for one or more network connections that were previously established by the device. The method may include selecting a network connection for the device among a plurality of available network connections based on an evaluation of the historical connection information such that the selected network connection substantially maintains connectivity to a network for a future period of time.

The historical connection information may include the connectivity disruptions in association with at least one of locations and times of when the connection disruptions previously occurred. The obtaining may include obtaining historical location pattern data providing a location pattern, and the selecting may include selecting the network connection among the plurality of available network connections based on an evaluation of the historical location pattern data and the historical connection information.

The selecting may further include selecting the network connection such that connection disruption is minimized within at least a portion of the location pattern for the future period of time.

DETAILED DESCRIPTION

The embodiments may provide systems and methods for selecting a network connection among a plurality of available network connections based on historical connection information of a device such that the selected network connection substantially maintains connectivity to a network for a future period of time. In some implementations, the historical connection information may include, for one or more previously established network connections, connectivity disruptions indicating whether connectivity was previously disrupted for the corresponding network connection, as well as other connection parameters such as signal strength, rate of data transfer, etc. Further, the historical connection information may be tracked along with locations of where the device was located and the times associated with this information.

In one example, a device may connect to the Internet using one of a plurality of different network connections such as Wi-Fi, 3G, 4G, and LTE, etc. Periodically, the device may scan and search for available network connections, and automatically connect to one of them. However, according to the embodiments, the device may include a smart network connection selector that selects a particular network connection such that the selected network connection can provide connectivity that is relatively free from lost connections for a future period of time so activity may not be disrupted.

In one implementation, the device may make this smart network selection based on the historical connection information. For example, the historical connection information may include previous connection disruptions, signal strength, the rate of data transfer, data segment size, as well as any other type of information related to the previous connection session. Then, in conjunction with current parameters (e.g., current signal strength, rate of data transfer, network congestion, data segment size) along with current location and time information, the smart network connector selector may select a network connection that provides a relatively stable connection for a future period of time while considering the current environment as well as information concerning previously-used connections. The historical connection information may provide insight into which connections are better in terms of a consistent, reliable connection in the foreseeable future. As a result, the smart network connection selector may minimize activity disruptions.

In particular, if the device previously used a Wi-Fi network interface having an access point associated with the user's work, and this Wi-Fi network connection was lost or terminated, this network disruption may be recorded. Similarly, other connection parameters (e.g., signal strength, data rate) associated with this network connection may be recorded in association with the location of the device and the time which the network connection was active and/or the connection was lost. Then, at some point in the future, when the device is making a network connection selection decision, the smart network connection selector may decide to select another network connection based on this historical connection information in order to provide connectivity for a future period of time so that the user can continue using the network without disruption.

In another implementation, if the user authorizes such tracking, the user's location history may be recorded, and the user's location history may be used to extract the user's location patterns which may be commonly visited places (including home and work) and commute patterns. For example, with the user's permission, the mobile device's location may be tracked, and one or more user patterns may be extracted from this information. The determined patterns may be stored as historical location pattern data. In this implementation, the network connection selector may obtain the historical location pattern, and then select the network connection among the plurality of available network connections based on the historical connection information and the current parameters in view of the historical location pattern data such that connectivity is maintained within at least a portion of the location pattern.

For example, the pattern may indicate a commute pattern, and if the current location/time falls within the pattern, the network connection selector may determine which network connection should be used to provide a relatively stable connection within the commute pattern by analyzing the current parameters in view of the previous network connections that were utilized along this route including whether any previous network disruptions have occurred. However, this network connection selection may be applied to any type of pattern beside commute patterns. These and other features will be explained with reference to the figures.

Figure 1:
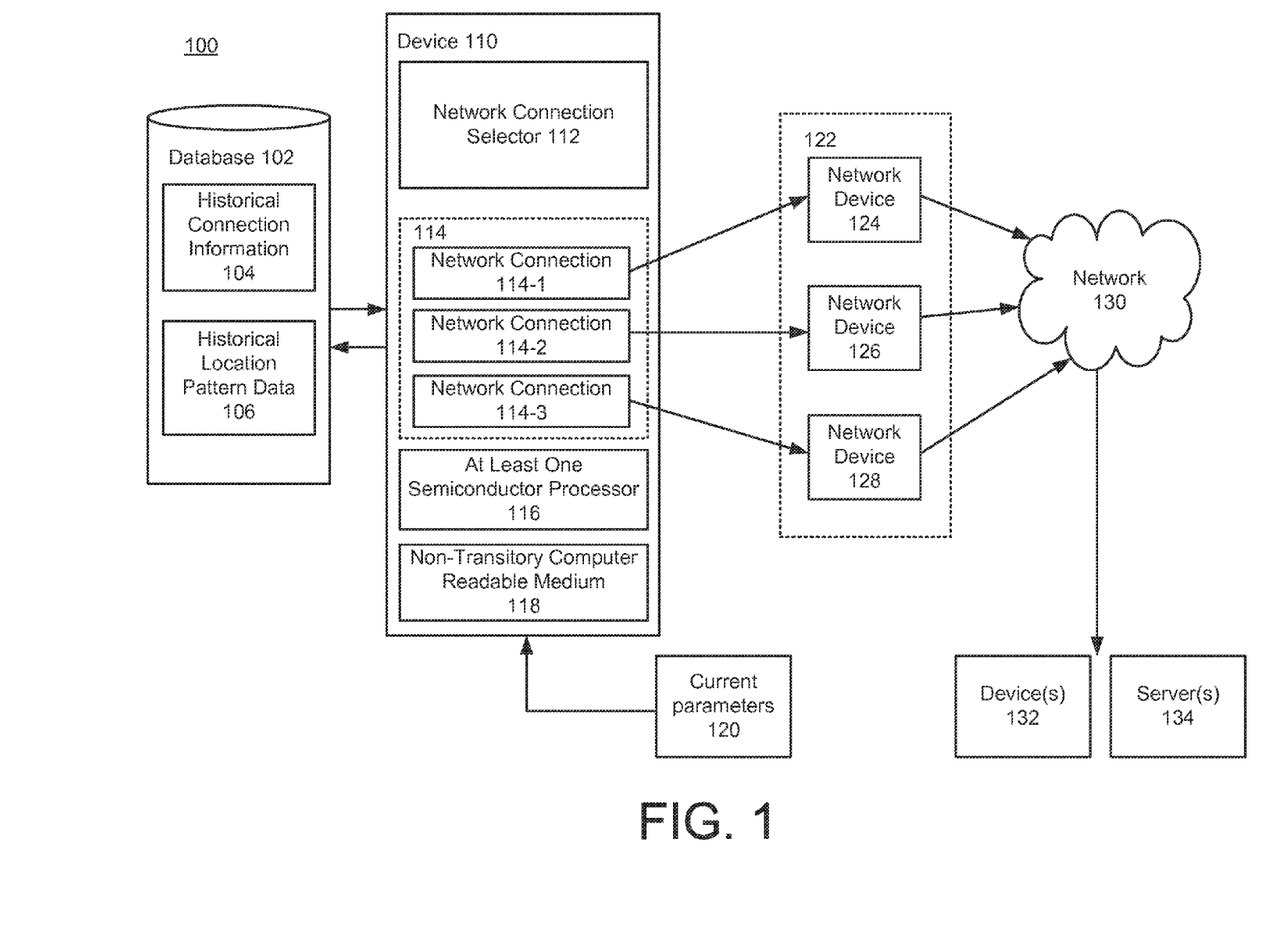
FIG. 1 illustrates a system for network connection selection according to an embodiment.

FIG. 1 illustrates a system 100 for network connection selection according to an embodiment. The system 100 may include a database 102, a device 110, and network architecture 122 for supporting multiple network connections interfaces for connecting to a network 130 to communicate with other device(s) 132 and server(s) 134. The database 102 may store historical connection information 104 and historical location pattern data 106 as further described below.

The device 110 may include any machine with hardware and software to support multiple network connections 114 (e.g., Wi-Fi, 3G, 4G, Wi-Max, etc.). For example, the device 110 may be any type of mobile computing device supporting two or more types of network connections 114 for connecting to the network 130. The network 130 may include, for example, any one or more of a cellular network, a satellite network, a personal area network (PAN), a local area network (LAN), a wide area network (WAN), a broadband network (BBN), and the Internet.

The network connections 114 may represent the various different types of connections that the device 110 may establish with the network 130 to allow the device 110 to transmit and/or receive data to/from the devices 132 and/or the servers 134. The devices 132 may be any type of computing device such a laptop computer, desktop computer, smartphone, phone, etc. The servers 134 may be any type of computing device for receiving, storing, or transmitting information via the network 130. In one example, the servers 134 may relate to hardware and software components that host web pages and applications. Each network connection 114 may permit the exchange of information between various devices/servers/systems using the network 130.

Each network connection 114 may represent the hardware (e.g., chipsets, controllers, antennas) and software components for establishing a network connection with the network 130. In some examples, the network connections 114 may include network connections relating to Wi-Fi, worldwide interoperability for microwave access (Wi-Max), $3^{rd}$ generation mobile telecommunications (3G), $4^{th}$ generation mobile telecommunications (4G), code division multiple access (CDMA), and/or long-term evolution (LTE). However, generally, each network connection 114 may relate to any type of wireless standard or protocol.

In the example of FIG. 1, the network connections 114 may include a first network connection 114-1, a second network connection 114-2, and a third network connection 114-3. However, although three network connections 114 are illustrated in FIG. 1, the embodiments encompass any number of network connections 114. In a non-limiting example, the first network connection 114-1 may be a 3G network interface, the second network connection 114-2 may be a 4G network interface, and the third network connection 114-3 may be a Wi-Fi network interface. Also, each network connection 114-1 does not necessarily relate to a different wireless standard or protocol. For example, the first network connection 114-1 may be a Wi-Fi connection using a first access point (e.g., work), and the second network connection 114-2 may be a Wi-Fi connection using a second access point (e.g., home). As such, each network connection 114 may generally refer to the connection to the network 130, where two different network connections 114 may both relate to the same type of interface but involve separate access points.

Therefore, the network architecture 122 may include the relevant network components for supporting the multiple network interfaces. For example, the network architecture 122 may include network device 124, network device 126, and network device 128. The network devices 124, 126, or 128 may be any system or device having communications capabilities to relay data between the device 110 and the network 130. Example networking devices may include access points, routers, signal transceivers, etc.

The networking device 124, 126, or 128 may be a single networking device, or may include multiple networking devices that are configured to relay data between the device 110 and the devices 132/servers 34 via the network 130. In the example of FIG. 1, the networking device 124 may be a cell site associated with the first network connection 114-1, the networking device 126 may be a Wi-Fi router associated with the second network connection 114-2, and the network device 128 may be a Wi-Max cell site associated with the third network connection 114-3. For example, if the second network connection 114-2 is selected, the device 110 may route information through the network 130 using the network device 126 (e.g., the Wi-Fi router).

The device 110 may be any type of mobile computing device having at least one semiconductor processor 116 and a non-transitory computer readable medium 118 that stores executable instructions, when executed by the at least one semiconductor processor 116, are configured to implement the functionalities of the device 110 and/or the system 100 as further explained below. In some examples, the device 110 may be mobile devices such as phones, smartphones, tablet computers, PDAs, laptop computers, or portable media players.

The non-transitory computer readable medium 118 may include one or more non-volatile memories, including, by way of example, semiconductor memory devices, e.g., EPROM, EEPROM, and flash memory devices; magnetic disks, e.g., internal hard disks or removable disks, magneto optical disks, and CD ROM and DVD-ROM disks. The at least one semiconductor processor 116 may include any type of general purpose computing circuitry or special purpose logic circuitry, e.g., an FPGA (field programmable gate array) or an ASIC (application specific integrated circuit). Also, the semiconductor processor 116 may be considered a processor that is configured to be coupled to a substrate.

Referring to FIG. 1, the device 110 may include a network connection selector 112 configured to select a network connection 114 (e.g., selecting one of the plurality of network connections 114) based on an evaluation of historical connection information 104 such that the selected network connection substantially maintains connectivity to the network 130 for a future period of time. In one example, the historical connection information 104 may include previous connection disruptions, signal strength, the rate of data transfer, data segment size, as well as any other type of information related to the previous connection. Further, the historical connection information 104 may be tracked along with locations of where the device 110 was located and the times associated with this information.

In some examples, the network connection selector 112 may be configured to periodically make a network connection selection. In one example, network connection selector 112 is configured to select the network connection 114 among the plurality of network connections 114 when the device 110 is activated from a power-saving state. For example, the activation from a power-saving state may indicate that the user may want to access the network 130. The power-saving state may be a state where the device 110 is asleep. As such, when the device 110 transitions to a full-power state, the network connection selector 112 may be configured to perform the smart network connection selection as discussed herein.

The device 110 may determine that the first network connection 114-1, the second network connection 114-2, and the third network connection 114-3 are available network connections to be used for connecting to the network 130. Then, the network connection selector 112 may decide which of these network connections 114 should be used for connecting to the network 130 such that the selected network connection 114 can provide connectivity that is relatively free from lost connections for a future period of time while the device 110 is communicating within the network 130.

According to the embodiments, the network connection selector 112 may select the best network connection that provides relatively undisrupted connectivity to the network 130. In one implementation, undisrupted connectivity refers to a network connection that is not lost or terminated. In another implementation, undisrupted connectivity refers to a network connection that remains connected to the network 130 but cannot exchange information within the network 130 (or cannot exchange information within the network 130 within a suitable timeframe). Instead of simply selecting a network connection 114 having the highest signal strength or the lowest power consumption, the network connection selector 112 may select the network connection 114 in a manner that provides connectivity for a future period of time so that the user may continue to exchange information with the network 130.

In one implementation, the network connection selector 112 may make this smart network selection based on the historical connection information 104. For example, the historical connection information 104 may include previous connection disruptions, signal strength, the rate of data transfer, data segment size, as well as any other type of information related to the previous connection. Then, in conjunction with current parameters 120 (e.g., current signal strength, rate of data transfer, network congestion, data segment size) along with current location and time information, the network connection selector 112 may select a network connection 114 that provides a relatively stable connection for a future period of time while considering the current environment as well as information concerning previously-used connections. The historical connection information 104 may provide insight into which connections 114 are preferred in terms of a consistent, reliable connection in the foreseeable future. As a result, the network connection selector 112 may minimize activity disruptions.

In one specific example, if the historical connection information 104 indicates that the first network connection 114-1 has one, two, or more connectivity disruptions, the network connection selector 112 may select another network connection (e.g., the second network connection 114-2) that has a lower number of connectivity disruptions. Further, the network connection selector 112 may obtain the location of the device 110, and evaluate the historical connection information 104 pertaining to the current location. For example, the historical connection information 104 may provide the connectivity disruptions across geographical locations, and the network connection selector 112 may select the network connection 114 that is known to provide relatively constant network connectivity. Further, the network connection selector 112 may obtain the current time (or time period), and determine which of the network connections 114 historically does not lose connectivity for that time (or time period). Further, the network connection selector 112 may use a combination of time and location for evaluating the network connections 114.

As such, although a particular network connection 114 may look relatively good in terms of signal strength at the particular location/time, the network connection selector 112 may choose a different network connection 114 if the historical connection information 104 indicates that previous connections resulted in connection disruptions while the device 110 was communicating with the network 130. Further, as the historical connection information 104 includes more and more information, the accuracy of the network connection selector 112 may increase thereby providing a more accurate selection in terms of which network connection 114 will be more stable going forward.

In addition, when making a network connection selection, the network connection selector 112 may evaluate the historical connection information 104 in view of historical location pattern data 106. For example, if the user authorizes such tracking, the user's location history may be recorded, and the user's location history maybe used to extract the user's location patterns which may be commonly visited places (including home and work) and commute patterns. For example, with the user's permission, the mobile device's location may be tracked, and one or more user patterns may be extracted from this information. The determined patterns may be stored as the historical location pattern data 106.

In this implementation, the network connection selector 112 may obtain the historical location pattern from the database 102, and then select the network connection 114 among the plurality of available network connections 114 based on the historical connection information 104 and the current parameters 120 in view of the historical location pattern data 106 such that connectivity is maintained within at least a portion of the extracted pattern. For example, the pattern may indicate a commute pattern, and if the current location/time falls within the pattern, the network connection selector 112 may determine which network connection 114 should be used to provide a relatively stable connection within the commute pattern by analyzing the current parameters 120 in view of the previous network connections that were utilized along this route including whether any previous network disruptions have occurred. However, it is noted that this network connection selection may be applied to any type of pattern beside commute patterns.

In one example, based on the time of day and the location, the pattern from the historical location pattern data 106 may indicate that the user may be following a particular pattern, e.g., work to home. At this time moment, the device 110 may be connected to the network 130 using the first network connection 114-1, which may be a Wi-Fi connection to the work's Wi-Fi access point. However, the network connection selector 112 may switch network connections by selecting the second network connection 114-2 because the pattern indicates that the user will be commuting back home and the historical connection information 104 indicates that the connection to the first network connection 114-1 at this time/location usually disconnects while the second network connection 114-2 provides a relatively constant network connection 114-2 throughout the predicted commute route.

Figure 2:
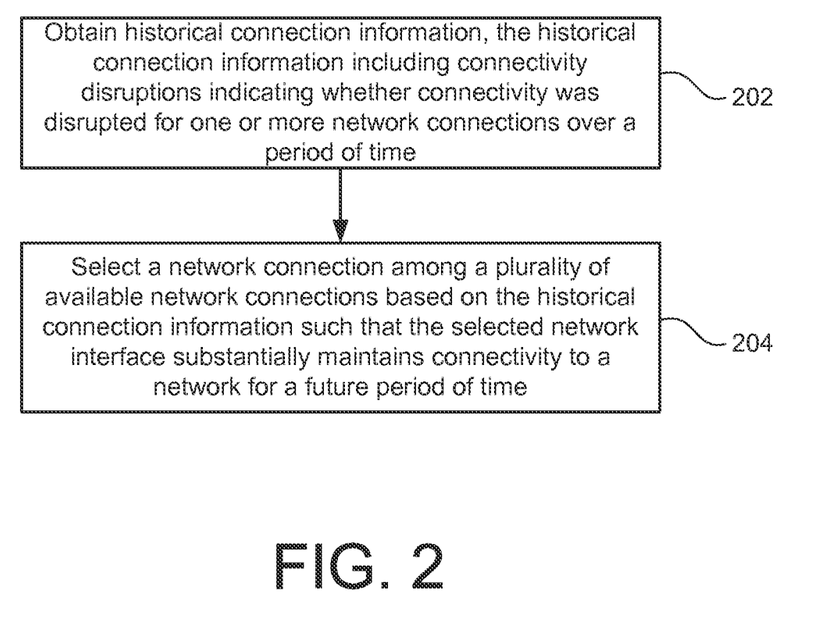
FIG. 2 illustrates a flowchart depicting example operations of the system of FIG. 1 according to an embodiment.

FIG. 2 illustrates a flowchart depicting example operations of the system 100 according to an embodiment. Although FIG. 2 is illustrated as a sequential, ordered listing of operations, it will be appreciated that some or all of the operations may occur in a different order, or in parallel, or iteratively, or may overlap in time.

Historical connection information may be obtained, where the historical connection information may include connectivity disruptions indicating whether connectivity was disrupted for one or more network connections over a period of time (202). For example, the network connection selector 112 may be configured to obtain the historical connection information 104 from the database 102. The historical connection information 104 may include previous connection disruptions, signal strength, the rate of data transfer, data segment size, as well as any other type of information related to the previous connection.

For example, for each previously-used connection, the historical connection information 104 may indicate whether any connections disruptions have occurred. In addition, the historical connection information 104 may provide the signal strength and the rate of data transfer that were used during the previous session. Also, the historical connection information 104 may provide other types of parameters related to the previous connection. Further, the historical connection information 104 may be tracked along with locations of where the device 110 was located and the times associated with this information.

A network connection may be selected among a plurality of available network connections based on the historical connection information such that the selected network interface substantially maintains connectivity to a network for a future period of time (204). For example, the network connection selector 112 may select a network connection (e.g., one of the plurality of network connections 114) among the plurality of available network connections 114. The network connection selector 112 may be configured to periodically make a network connection selection. In one example, network connection selector 112 is configured to select the network connection 114 among the plurality of network connections 114 when the device 110 is activated from a power-saving state. For example, the activation from a power-saving state may indicate that the user may want to access the network 130. The power-saving state may be a state where the device 110 is asleep. As such, when the device 110 transitions to a full-power state, the network connection selector 112 may be configured to perform the smart network connection selection as discussed herein.

The network connection selector 112 may select the best network connection that provides relatively undisrupted connectivity to the network 130. In one implementation, undisrupted connectivity refers to a network connection that is not lost or terminated. In another implementation, undisrupted connectivity refers to a network connection that remains connected to the network 130 but cannot exchange information within the network 130 (or cannot exchange information within the network 130 within a suitable timeframe). Instead of simply selecting a network connection 114 having the highest signal strength or the lowest power consumption, the network connection selector 112 may select the network connection 114 in a manner that provides connectivity for a future period of time so that the user may continue to exchange information with the network 130.

In one implementation, the network connection selector 112 may make this smart network selection based on the historical connection information 104. For example, the historical connection information 104 may include previous connection disruptions, signal strength, the rate of data transfer, data segment size, as well as any other type of information related to the previous connection. Then, in conjunction with current parameters 120 (e.g., current signal strength, rate of data transfer, network congestion, data segment size) along with current location and time information, the network connection selector 112 may select a network connection 114 that provides a relatively stable connection for a future period of time while considering the current environment as well as information concerning previously-used connections. The historical connection information 104 may provide insight into which connections 114 are preferred in terms of a consistent, reliable connection in the foreseeable future. As a result, the network connection selector 112 may minimize activity disruptions.

Figure 3:
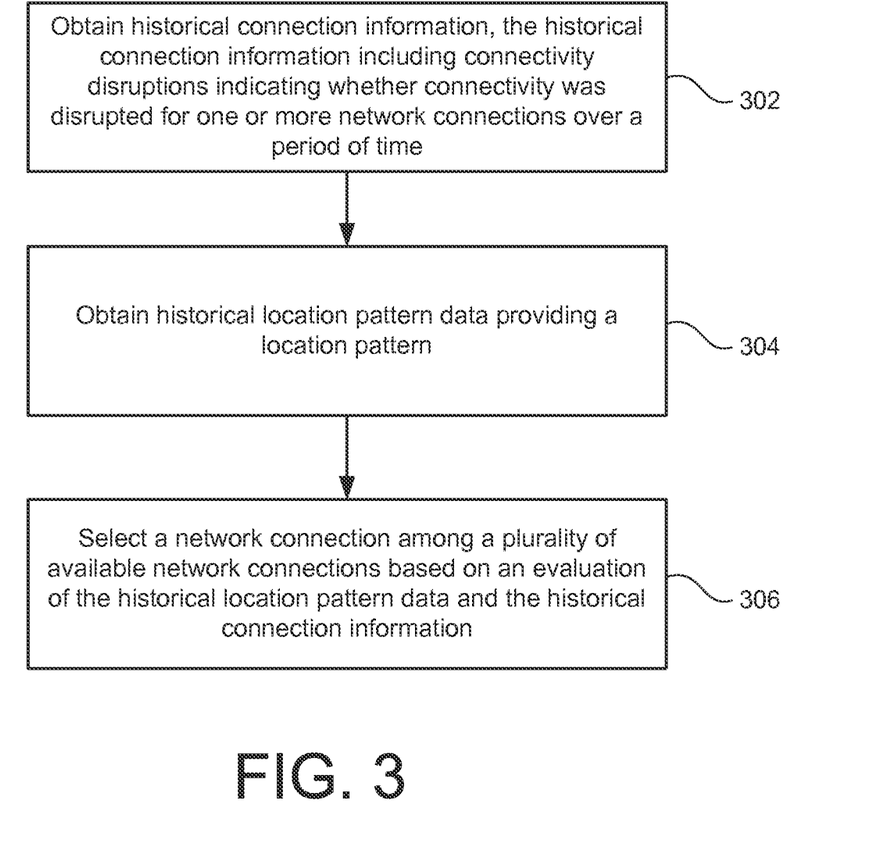
FIG. 3 illustrates a flowchart depicting example operations of the system 100 according to an embodiment.

FIG. 3 illustrates a flowchart depicting example operations of the system 100 according to an embodiment. Although FIG. 3 is illustrated as a sequential, ordered listing of operations, it will be appreciated that some or all of the operations may occur in a different order, or in parallel, or iteratively, or may overlap in time.

Historical connection information may be obtained, the historical connection information including connectivity disruptions indicating whether connectivity was disrupted for one or more network connections over a period of time (302). For example, the network connection selector 112 may be configured to obtain the historical connection information 104 from the database 102. The historical connection information 104 may include previous connection disruptions, signal strength, the rate of data transfer, data segment size, as well as any other type of information related to the previous connection.

Historical location pattern data providing a location pattern may be obtained (304). For example, the network connection selector 112 may be configured to obtain historical location pattern data 106 from the database 102. For example, if the user authorizes such tracking, the user's location history may be recorded, and the user's location history maybe used to extract the user's location patterns which may be commonly visited places (including home and work) and commute patterns. For example, with the user's permission, the mobile device's location may be tracked, and one or more user patterns may be extracted from this information. The determined patterns may be stored as the historical location pattern data 106.

A network connection may be obtained among a plurality of available network connections based on an evaluation of the historical location pattern data and the historical connection information (306). In this implementation, the network connection selector 112 may obtain the historical location pattern from the database 102, and then select the network connection 114 among the plurality of available network connections 114 based on the historical connection information 104 and the current parameters 120 in view of the historical location pattern data 106 such that connectivity is maintained within at least a portion of the extracted pattern. For example, the pattern may indicate a commute pattern, and if the current location/time falls within the pattern, the network connection selector 112 may determine which network connection 114 should be used to provide a relatively stable connection within the commute pattern by analyzing the current parameters 120 in view of the previous network connections that were utilized along this route including whether any previous network disruptions have occurred. However, it is noted that this network connection selection may be applied to any type of pattern beside commute patterns.

Figure 4:
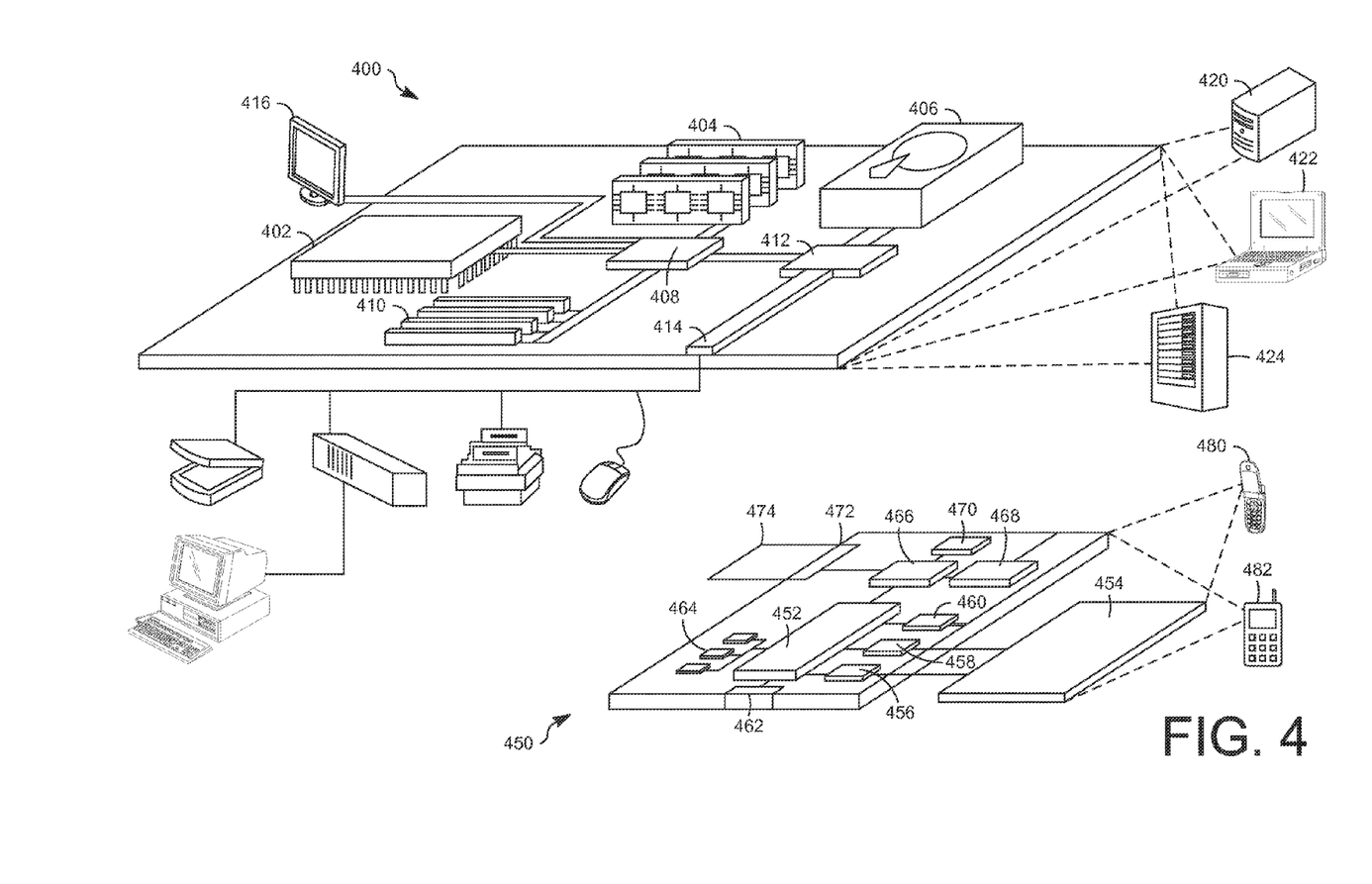
FIG. 4 is a block diagram showing example or representative computing devices and associated elements that may be used to implement the system of FIG. 1.

FIG. 4 is a block diagram showing example or representative computing devices and associated elements that may be used to implement the systems of FIG. 1. FIG. 4 shows an example of a generic computer device 400 and a generic mobile computer device 450, which may be used with the techniques described here. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provide in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning system) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Thus, various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be appreciated that the above embodiments that have been described in particular detail are merely example or possible embodiments, and that there are many other combinations, additions, or alternatives that may be included.

Also, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations may be used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "obtaining" or "selecting" or "calculating" or "determining" or "displaying" or "providing" or the like, refer to the action and processes of a computer system, or similar electronic computing device, that manipulates and transforms data represented as physical (electronic) quantities within the computer system memories or registers or other such information storage, transmission or display devices.

What is claimed is:

1. A device for network connection selection, comprising:
at least one semiconductor processor;
a non-transitory computer-readable medium storing instructions which, when executed by the at least one semiconductor processor, are configured to implement,
a network connection selector configured to obtain historical connection information related to previous network connections utilized by a device, the historical connection information including signal strength, rate of data transfer, and connectivity disruptions indicating whether connectivity was disrupted for one or more network connections that were previously established by the device, the network connection selector configured to extract a predicted location path of the device based on location history of the device, the network connection selector configured to obtain current parameters for one or more of a plurality of available network connections, the network connection selector configured to select, when the device is activated from a power-saving state to a full-power state, a network connection for the device among the plurality of available network connections based on an evaluation of the current parameters and the historical connection information along the predicted location path of the device such that the selected network connection substantially maintains connectivity to a network when the device moves along the predicted location path, wherein the plurality of available network connections include a Wi-Fi connection, and a mobile network connection, wherein when the Wi-Fi connection has a higher signal strength than the mobile network connection at a time of selecting, the mobile network connection is selected based on the mobile network connection having less disruptions than the Wi-Fi connection over the predicted location path.

2. The device of claim 1, wherein the plurality of available network connections includes a plurality of network interfaces, and the network connection selector is configured to select one of the plurality of network interfaces based on historical connection information pertaining to at least one of the plurality of network interfaces.

3. The device of claim 1, wherein the Wi-Fi connection is a first Wi-Fi connection having a first access point, and the plurality of available network connections also include a second Wi-Fi network connection having a second access point.

4. The device of claim 1, wherein the historical connection information indicates locations and times of when the connection disruptions previously occurred.

5. The device of claim 1, wherein the signal strength and the rate of data transfer are recorded in association with a location of the device and a time in which a previously-used network was disconnected.

6. The device of claim 1, wherein the predicted location path of the device includes a commute path of a user of the device.

7. The device of claim 1, wherein the network connection selector is configured to determine that a current time period is within a time period associated with the predicated location path, and the network connection selector is configured to select the network connection that substantially maintains connectivity to the network along the predicted location path.

8. The device of claim 1, wherein the device is a mobile computing device.

9. A non-transitory computer readable medium storing instructions, when executed by at least one semiconductor processor, are configured to:

obtain historical connection information related to previous network connections utilized by a device, the historical connection information including signal strength, rate of data transfer, data segment size, and connectivity disruptions indicating whether connectivity was disrupted for one or more network connections that were previously established by the device;

extract a predicted location path of the device based on location history of the device including determine a first commonly visited location and a second commonly visited location, and determine a travel route between the first commonly visited location and the second commonly visited location;

obtain current parameters for one or more of a plurality of available network connections, the current parameters including current signal strength, rate of data transfer, network congestion, and data segment size, the plurality of available network connections including a mobile network connection, a first Wi-Fi connection having a first access point, and a second Wi-Fi connection having a second access point; and select, when the device is activated from a power-saving state to a full-power state, a network connection for the device among the plurality of available network connections based on an evaluation of the current parameters and the historical connection information along the predicated location path such that the selected network connection substantially maintains connectivity to a network along the travel route, wherein, when the first and second Wi-Fi connections have a higher signal strength than the mobile network connection at a time of selecting, the mobile network connection is selected based on the mobile network connection having less disruptions than both the first and second Wi-Fi connections over the predicted location path.

10. The non-transitory computer readable medium of claim 9, wherein the plurality of available network connections includes a plurality of network interfaces, and the network connection selector is configured to select one of the plurality of network interfaces based on historical connection information pertaining to at least one of the plurality of network interfaces.

11. The non-transitory computer readable medium of claim 9, wherein the historical connection information indicates locations and times of when the connection disruptions previously occurred.

12. The non-transitory computer readable medium of claim 9, wherein the signal strength and the rate of data transfer are recorded in association with a location of the device and a time in which a previously-used network was active.

13. The non-transitory computer readable medium of claim 9, wherein the travel path is a commute path between a user's home and work.

14. The non-transitory computer readable medium of claim 13, wherein the instructions include instructions to select the network connection such that connection disruption is minimized within at least a portion of the commute path between the user's home and work.

15. A computer-implemented method for network connection selection, the computer-implemented method comprising:

obtaining historical connection information related to previous network connections utilized by a device, the historical connection information including signal strength, rate of data transfer, data segment size, and connectivity disruptions indicating whether connectivity was disrupted for one or more network connections that were previously established by the device; and extracting a predicted location path of the device based on location history of the device;

determining that a current time period is within a time period associated with the predicated location path;

obtaining current parameters for one or more of a plurality of available network connections, the current parameters including current signal strength, rate of data transfer, network congestion, and data segment size, the plurality of available network connections including a mobile network connection, a first Wi-Fi connection having a first access point, and a second Wi-Fi connection having a second access point; and selecting, when the device is activated from a power-saving state to a full-power state, a network connection for the device among the plurality of available network connections based on an evaluation of the current parameters and the historical connection information along the predicated location path of the device such that the selected network connection substantially maintains connectivity to a network when the device moves along the predicted location path, wherein, when the first and second Wi-Fi connections have a higher signal strength than the mobile network connection at a time of selecting, the mobile network connection is selected based on the mobile network connection having less disruptions than both the first and second Wi-Fi connections over the predicted location path.

16. The computer-implemented method of claim 15, wherein the historical connection information indicates locations and times of when the connection disruptions previously occurred.

17. The computer-implemented method of claim 15, wherein the predicted location path of the device is a commute path of a user of the device.

* * * * *